United States Patent [19]

Asada et al.

[11] Patent Number: 4,706,144
[45] Date of Patent: * Nov. 10, 1987

[54] ROTARY HEAD DEVICE WITH FLUID BEARING

[75] Inventors: Takafumi Asada, Hirakata; Cyuryo Yoshida, Amagasaki; Tadao Shioyama, Sakurai; Yoshiteru Hosokawa, Hirakata, all of Japan

[73] Assignee: Matsushita Electric Industrial Co., Ltd., Osaka, Japan

[*] Notice: The portion of the term of this patent subsequent to Nov. 10, 2004 has been disclaimed.

[21] Appl. No.: 619,147
[22] PCT Filed: Sep. 30, 1983
[86] PCT No.: PCT/JP83/00321
  § 371 Date: May 30, 1984
  § 102(e) Date: May 30, 1984
[87] PCT Pub. No.: WO84/01464
  PCT Pub. Date: Apr. 12, 1984

[30] Foreign Application Priority Data

Sep. 30, 1982 [JP] Japan .................................. 57-172723

[51] Int. Cl.⁴ ........................ G11B 5/53; G11B 21/04
[52] U.S. Cl. .................................... 360/107; 360/84; 360/108; 360/130.24
[58] Field of Search .................................... 360/84–85, 360/107–108, 102, 130.22–130.24; 384/99–100, 109, 111–113, 115, 120–121, 123

[56] References Cited

U.S. PATENT DOCUMENTS

| | | | |
|---|---|---|---|
| 3,494,674 | 2/1970 | Muijderman et al. | 384/113 |
| 3,763,327 | 10/1973 | Hescher | 360/108 |
| 4,031,558 | 6/1977 | Kusaka | 360/130.24 |
| 4,080,639 | 3/1978 | Gunschmann | 360/107 |
| 4,099,210 | 7/1978 | Dolby | 360/108 |
| 4,197,565 | 4/1980 | Watanabe | 360/107 X |
| 4,408,239 | 10/1983 | Ushiro | 360/107 |

FOREIGN PATENT DOCUMENTS 55-163320 12/1980 Japan .................................. 384/123

Primary Examiner—Stuart N. Hecker
Assistant Examiner—Benjamin E. Urcia
Attorney, Agent, or Firm—Wenderoth, Lind & Ponack

[57] ABSTRACT

A rotary head device with a fluid bearing including an upper cylinder and lower cylinder, a sleeve provided on the lower cylinder, a rotary shaft rotatably inserted in the sleeve, and pairs of cylindrical rotary transformers are mounted on the upper and lower cylinders, with two spaced apart herringbone patterns of grooves (26A and 26B) formed either on the rotary shaft or on the inside surface of the sleeve, the length of the herringbone pattern of grooves being larger on the upper cylinder end of the shaft or sleeve, and smaller on a motor end of the shaft or sleeve.

3 Claims, 4 Drawing Figures

ROTARY HEAD DEVICE WITH FLUID BEARING

TECHNICAL FIELD

The present invention relates to a rotary head device using a dynamic pressure type fluid bearing for use in video tape recorders (hereinafter abbreviated to VTR) and provides a rotary head device which is compact and excellent in rotary performance.

BACKGROUND ART

In the conventional fluid bearing cylinder device, with its particular structure as shown in FIG. 1, a fixed shaft 2 is pressed in and secured in place at the central portion of a lower cylinder 1, a sleeve 3 is rotatably mounted on the fixed shaft 2, a thrust bearing seat 4 is screwed on the top of the fixed shaft 2 and a thrust bearing 5 is screwed on the upper end of the sleeve 3. Herringbone shape patterns of grooves 6A and 6B are formed on the fixed shaft 2 and a spiral groove 7 are formed on the lower surface of the thrust bearing 5 by etching, etc. The space inside the bearing chamber formed between the shaft 2 and the sleeve 3 contains lubricant 8, which is oil or grease, etc., thereby comprising a dynamic pressure type fluid bearing. A rotary magnetic head 10 is mounted on an upper cylinder, which is mounted on the sleeve 3. Also mounted on the sleeve 3 is a disc shape rotary transformer 11 on the rotary side of the rotary head device for transmitting to the stationary side an electrical signal extracted from a magnetic tape through the magnetic head 10, not shown in the drawings. An armature magnet 13 is supported on a magnet case 14 of a motor attached to a lower end of the sleeve 3, which together with the parts mentioned above comprise a rotary side unit 20. On the other hand, inside the lower cylinder 1 is mounted a disc shape rotary transformer 12 on the stationary side of the rotary head device which receives the aforementioned electric signal. Also inside the lower cylinder 1, there is secured a motor stator 19 consisting of an iron plate 18, a printed substrate 17 and a coil 16. As the motor is energized under this state, the rotary unit 20 begins turning, producing a pressure by a pumping action of the patterns of grooves 6A, 6B and 7; then, the unit is floated up by the rising rigidity of the oil film, thereby enabling rotation of the rotary side unit 20 without making contact with the stationary side unit. Under this condition, the force of the armature magnet 13 to attract the iron plate 18 and the dead weight of the rotary side unit is exerted in the direction of B, as shown in FIG. 1, while a force opposing them is produced in the direction A due to the pumping action of the spiral groove 7.

However, in such a structure as described above, the dimension in the axial direction is large, thus detracting from compactness of the device. When the device is tilted sideways by 90 degrees to its horizontal position, as shown in FIG. 2, the fixed shaft 2 tends to be warped due to the dead weight of the rotary unit and the side pressure by a magnetic tape 60, causing a large shift in the relative position between the magnetic head 10 and the magnetic tape 60. As a consequence, the picture recorded by the VTR cannot be reproduced. For those and other such reasons, the structure was determined to be unacceptable in its performance as a portable VTR.

SUMMARY OF THE INVENTION

The present invention resides in a rotary head device using a dynamic pressure type fluid bearing having a lower cylinder, a rotary shaft which rotates in a sleeve placed at the center of the lower cylinder, an upper cylinder mounted on one end of the rotary shaft and having a head, a motor installed on the other end of the rotary shaft, with herringbone groove patterns formed on either one of the rotary shaft or the inner surface of the sleeve, the axial length of the herringbone groove pattern being larger on the upper cylinder side, but smaller on the motor side, said device including a pair of cylindrical rotary side and a pair of stationary side cylindrical rotary transformers.

DESCRIPTION OF THE PREFERRED EMBODIMENT

Figure 3:
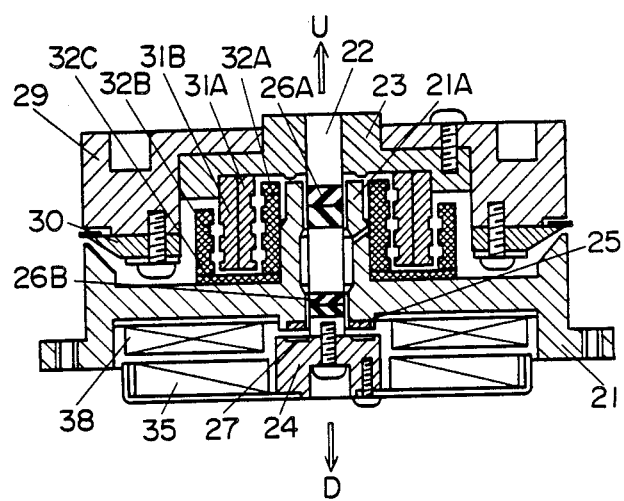
FIG. 3 is a sectional view of an embodiment of this invention.

In the following, an embodiment of this invention is described with reference to FIGS. 3 and 4. FIG. 3 is a sectional view of a fluid bearing cylinder device embodying this invention. According to FIG. 3, 21 denotes a stationary support means comprising a lower cylinder, which has a sleeve 21A at its center. Numeral 22 designates a rotary shaft fixed to a disc 23 and turning in the sleeve 21A; 24 denotes a thrust bearing member fixed on the bottom surface of the rotary shaft at a right angle thereto; 26A and 26B denote herringbone patterns of grooves, which are 5∞20 microns (hereinafter represented by $\mu$m) formed by etching or machining; 27 denotes a spiral groove formed on the thrust bearing member; and a lubricant having a viscosity of about 20 centipoises and relatively excellent in temperature characteristics is provided in the patterns of grooves 26A, 26B and the spiral groove 27, whereby a dynamic pressure type fluid bearing is composed. Numeral 29 denotes a rotatable support means comprising an upper cylinder screwed onto the disc 23, which has a magnetic head 30. Reference codes 31A and 31B denote a pair of coaxial rotary side cylindrical rotary transformers mounted on the disc 23; and 32A and 32B denote a pair of coaxial stationary side cylindrical rotary transformers mounted on disc 32C; 31A, 31B and 32A, 32B being paired to transmit to the stationary side the electric signal extracted from the magnetic tape by means of the rotary magnetic head 30. Numeral 24 denotes a thrust bearing member which has a groove 27 and which is mounted on an end of the rotary shaft 22; 35 denotes a motor rotor mounted on the lower end of the rotary shaft 22 by means of the thrust bearing 24; and 38 denotes a motor stator mounted on the lower cylinder 21. Numeral 25 designates a hard surface layer on the sleeve 21A. A rotary unit 40 thus comprises disc 23, rotary transformers 31A, 31B, and magnetic head 30.

In the following, the operation of this device is described: As the motor is energized, the rotary unit 40 begins turning and is floated up by the pumping action of grooves 26A, 26B and 27 and turned without making contact with the stationary unit.

Figure 1:
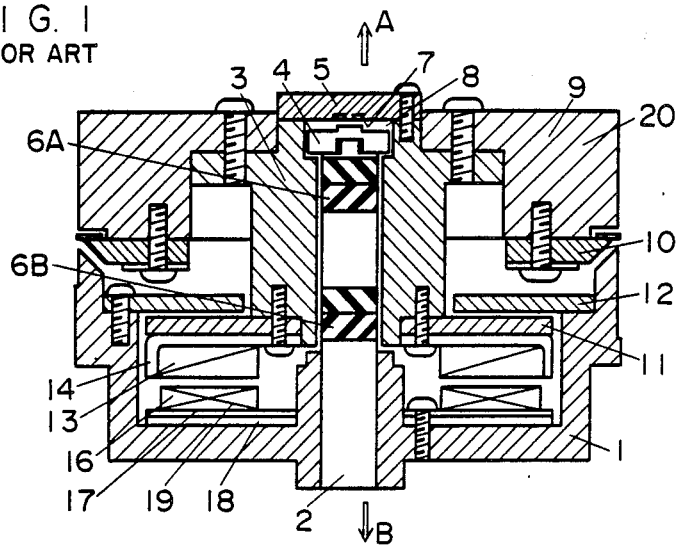
FIG. 1 is a sectional view of a conventional fluid bearing cylinder.
Figure 2:
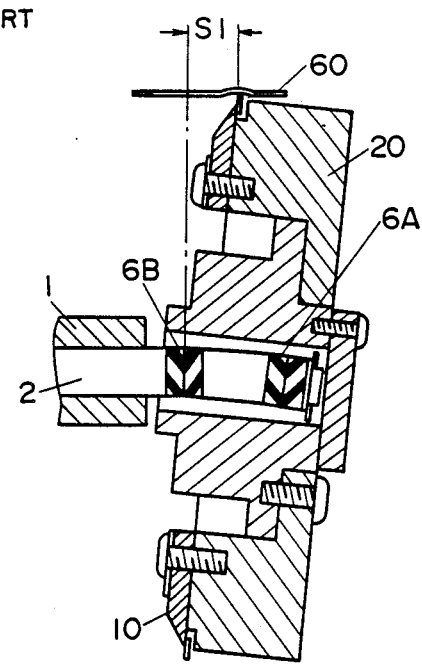
FIG. 2 is a sectional view of a the principal part of the same in its horizontal posture.

Next, the rotary transformers 31A, 31B and 32A, 32B are described. As described above, the rotary head device is required to be compact and thin for it to be portable. Conventional rotary transformers 11 and 12 shown in FIG. 1 are in disc shapes. At least two such discs, each 2~2.5 milimeters thick, are necessary and their thickness occupies approximately 10~20 percent of the total thickness of the rotary head device. According to this invention, the dimension of the rotary head device as a whole can be made thin by making the transformers cylindrical in shape, as shown in FIG. 3. Besides, in the rotary head device, rotary transformers having a number of annular channels, for receiving coil windings as is well known in the art, (corresponding to the number of grooves on the rotary transformer in terms of its configuration) equal to the number of magnetic heads 30 mounted thereon are required; generally 2~5 channels are necessary. In this device, two types of rotary transformers 31A and 31B differing in number of channels, such as 3 channels and 2 channels, respectively, are coaxially mounted and through a combination of these two types of transformers, rotary head devices differing in specifications, for example having 2, 3 and 5 channels, may be reasonably produced.

Figure 4:
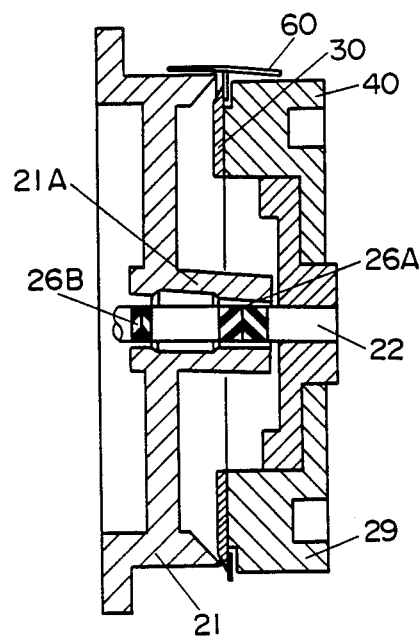
FIG. 4 is a sectional view of the principal part of the fluid bearing cylinder device of the present invention in its horizontal posture.

FIG. 4 represents the rotary head device of this invention in the state of being turned by 90 degrees to its horizontal posture. In the device of this invention, the length in the longitudinal direction of the shaft 22 of the herringbone pattern of grooves 26A closest to the upper cylinder 29 end of the rotary shaft 22 is made greater than the length of the herringbone pattern of grooves 26B on the motor side, which is smaller. Accordingly, even when the sleeve 21A of the lower cylinder is bent downward, because of the high oil film rigidity on groove 26A and the low oil film rigidity on 26B, the rotary shaft will not be in parallel with the sleeve, but the tilting of this sleeve 21A is cancelled, so that it turns while remaining parallel to the lower cylinder. Consequently, as this device is observed as a whole, it may be said, a fluid bearing excellent in angular rigidity has been obtained, in which relative shift between the magnetic tape 60 and the head 30 is small; thus this device has excellent performance in use for portable types of equipment which are usable at every angle.

INDUSTRIAL APPLICABILITY

A rotary head device using a fluid bearing which is compact and excellent in portability is obtained by making a larger pattern of herringbone grooves on the upper cylinder end, and a smaller pattern of herringbone grooves on the motor end of a rotary shaft, and by providing pairs of rotary side and stationary side cylindrical transformers mounted coaxially with respect to the rotary shaft and to each other.

What is claimed is:

1. A rotary head device with a fluid bearing comprising:
   a stationary support means;
   a rotatable shaft extending in a longitudinal direction having a free end thereof rotatably supported in said stationary support means;
   rotatable support means fixedly mounted on the other end of said rotatable shaft;
   a least one magnetic head disposed on said rotatable support means;
   a cylindrical rotary transformer means mounted coaxially around said rotatable shaft for transmitting an electrical signal to and from said at least one magnetic head;
   motor means for rotating said rotatable support means; and
   bearing means disposed between said rotatable shaft and said stationary support means, said bearing means including a lubricant and a first pattern of herringbone shaped grooves on said rotatable shaft or on said stationary support means at a position near said other end of said rotatable shaft and a second pattern of herringbone shaped grooves on said rotatable shaft or on said stationary support means at a position between said first pattern and said free end of said rotatable shaft, said first pattern differing from said second pattern only in that said first pattern has a length in said longitudinal direction which is greater than the length of said second pattern to provide greater bearing rigidity to said other end of said rotatable shaft due to a lubricating film between said rotatable shaft and said stationary support means, whereby said difference in pattern lengths compensates for differences in the radial loads taken up by said bearing means.

2. A rotary head device with a fluid bearing comprising:
   a stationary support means;
   a rotatable shaft extending in a longitudinal direction having a free end thereof rotatably supported in said stationary support means;
   rotatable support means fixedly mounted on the other end of said rotatable shaft;
   at least one magnetic head disposed on said rotatable support means;
   a cylindrical rotary transformer means mounted coaxially around said rotatable shaft for transmitting an electrical signal to and from said at least one magnetic head said cylindrical rotary transformer means comprising a first pair of coaxial cylindrical rotary transformer halves mounted on said rotatable support means and a second pair of coaxial cylindrical rotary transformer halves mounted on said stationary support means, said first pair of coaxial cylindrical rotary transformer halves having at least one annular channel extending around a cylindrical surface thereof, said second pair of coaxial cylindrical rotary transformer halves having at least one annular channel extending around a cylindrical surface thereof and coaxial to said at least one annular channel of said first pair of coaxial cylindrical rotary transformer halves for transmitting an electrical signal to and from said at least one magnetic head;
   motor means for rotating said rotatable support means; and
   bearing means disposed between said rotatable shaft and said stationary support means, said bearing means including a lubricant and a first pattern of herringbone shaped grooves on said rotatable shaft or on said stationary support means at a position near said other end of said rotatable shaft and a second pattern of herringbone shaped grooves on said rotatable shaft or on said stationary support means at a position between said first pattern and said free end of said rotatable shaft, said first pattern differing from said second pattern only in that said first pattern has a length in said longitudinal direction which is greater than the length of said second pattern to provide greater bearing rigidity to said other end of said rotatable shaft due to a lubricating film between said rotatable shaft and said stationary support means.

3. The rotary head device of claim 2, wherein a plurality of magnetic heads are disposed on said rotatable support means and each one of said first pair of coaxial cylindrical rotary transformer halves has at least one annular channel extending around a cylindrical surface thereof, the total number of channels disposed on said first pair of coaxial cylindrical rotary transformer halves corresponding to the total number of magnetic heads on said rotatable support means, and each of said second pair of coaxial cylindrical rotary transformer halves has at least one annular channel extending around a cylindrical surface thereof and coaxial to a corresponding annular channel of said first pair of coaxial cylindrical rotary transformer halves.

* * * * *